United States Patent [19]

Hunt

[11] 4,258,889
[45] Mar. 31, 1981

[54] METHOD AND APPARATUS FOR LAMINAR FLOW CONTROL

[75] Inventor: James Hunt, Renton, Wash.

[73] Assignee: The Boeing Company, Seattle, Wash.

[21] Appl. No.: 25,143

[22] Filed: Mar. 29, 1979

[51] Int. Cl.³ .............................................. B64C 21/06
[52] U.S. Cl. .................................. 244/207; 244/129.4; 244/130; 156/293
[58] Field of Search ............ 244/207, 208, 209, 129.4, 244/129.5, 129.3, 130; 114/224; 156/293; 428/312, 67, 125, 133

[56] References Cited

U.S. PATENT DOCUMENTS

| | | | |
|---|---|---|---|
| 2,354,586 | 7/1944 | Fischer | 156/293 |
| 2,602,764 | 7/1952 | Billingham | 156/293 |
| 2,643,832 | 6/1953 | Thwaites | 244/209 |
| 2,742,247 | 4/1956 | Lachmann | 244/130 |
| 2,843,341 | 7/1958 | Dannenberg et al. | 244/209 |
| 3,128,973 | 4/1964 | Dannenberg | 244/209 |
| 3,203,648 | 8/1965 | Vanesian | 244/209 |
| 3,261,576 | 7/1966 | Valyi | 244/130 |
| 3,421,577 | 1/1969 | Valyi | 244/208 |
| 3,467,348 | 9/1969 | Lemelson | 244/208 |
| 3,521,837 | 7/1970 | Papst | 244/130 |
| 3,617,364 | 11/1971 | Jareme et al. | 428/312 |
| 3,873,392 | 3/1975 | Niebyliski | 428/312 |
| 4,171,785 | 10/1979 | Isenberg | 244/207 |

OTHER PUBLICATIONS

Danmemberg, et al. "The Resistance to Airflow of Porous Material" NACA TN 3094, 1954.
Duocel, Energy Research and Generation, Inc. Oakland, Ca. 94608.

Primary Examiner—Galen L. Barefoot
Attorney, Agent, or Firm—Ronald E. Suter; Bernard A. Donahue

[57] ABSTRACT

A method of installing a compressible insert in an exterior surface of a body is disclosed. There is also disclosed a laminar flow control arrangement that may be produced by such method.

7 Claims, 8 Drawing Figures

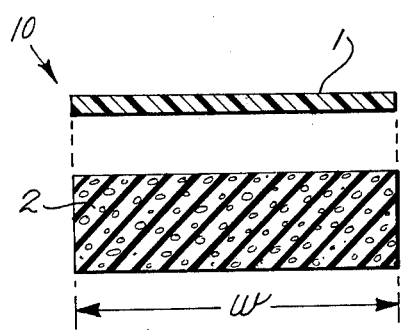
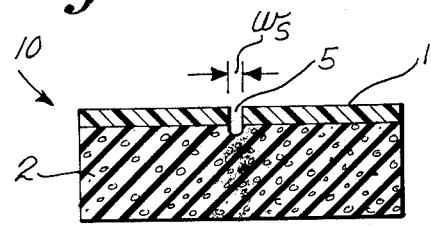
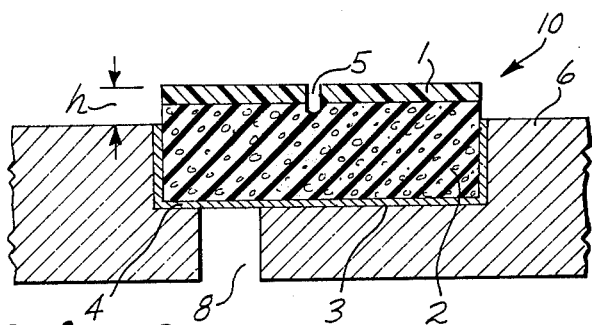
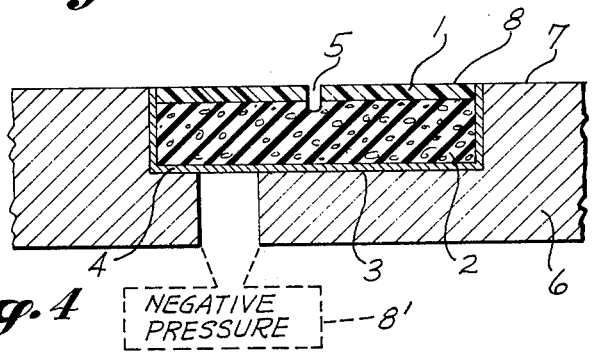
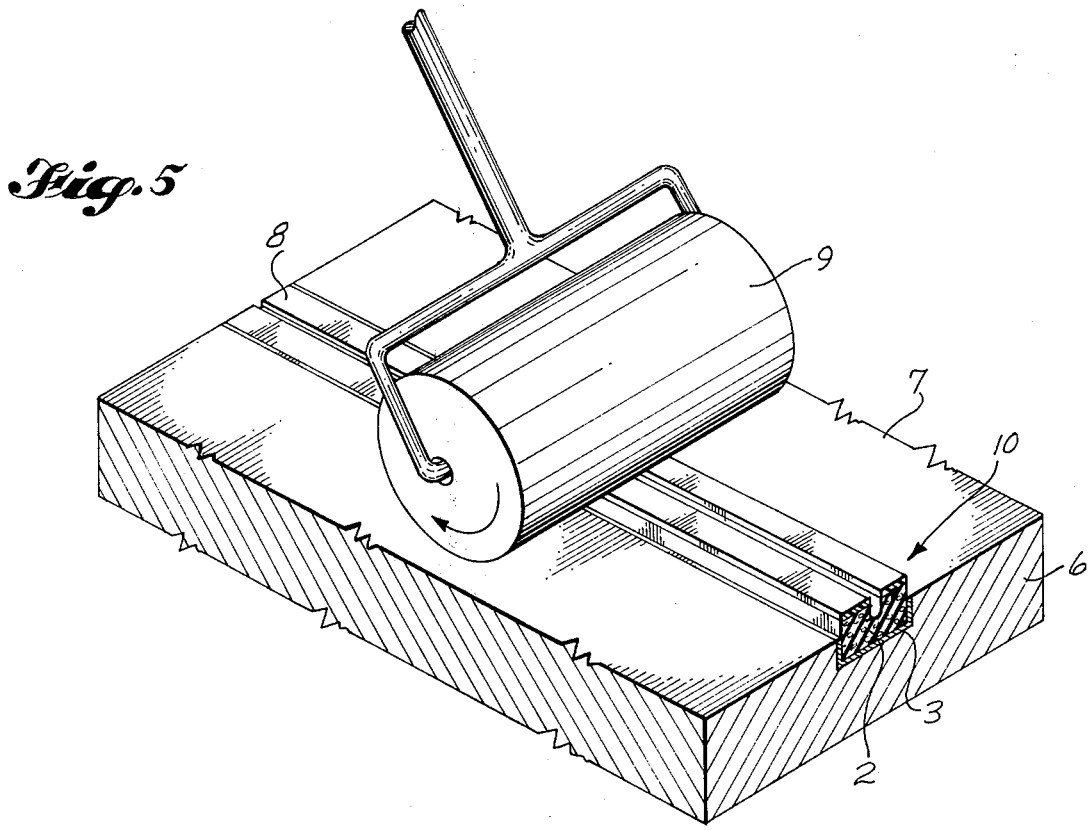

METHOD AND APPARATUS FOR LAMINAR FLOW CONTROL

The invention described herein was made in the performance of work under NASA Contract No. NAS1-14630 and is subject to Section 305 of the National Aeronautics and Space Act of 1958 (72 Stat. 435; 42 U.S.C. 2457).

FIELD OF THE INVENTION

This invention relates generally to the provision of a surface leveling insert or filler in a slot or depression in a surface. More particularly, this invention relates to a porous, inelastically compressible insert and a simplified method of installing such insert in a slot or depression in a surface where the smoothness of such surface is critical. The present invention finds particularly useful application in the field of laminar flow control and particularly where control is accomplished by drawing small amounts of boundary layer into a suction slot in the surface of a body. In the intersects of clarity and brevity, much of the following discussion and description of examples of the invention are directed toward use of the insert in a boundary layer or laminar flow control system. However, it is expressly to be understood that the invention may be utilized wherever surface smoothness is desired, such as, for example, auto body repair, wood filling or inlay work and the like.

BACKGROUND OF THE INVENTION

It is well known that a body moving through a fluid experiences skin friction, or drag forces, which arise within the so-called boundary layer, adjacent the outer surface of the body. Flow within this layer may be either laminar or turbulent, the skin friction resulting from the former being less than that from the latter. To increase the area of the body over which the flow is laminar, it is advantageous to remove some of the boundary layer from the surface by suction, that is by drawing some of the fluid into the body through the surface.

Several approaches have been taken to accomplish this goal. One suggestion has been to provide a continuous, porous surface over a large area of the body. Problems arise since, in general, the porous materials utilized are not able to adequately withstand the stresses applied. Also, with a large area of porous material exposed to the environment, flow impedence or clogging frequently result.

It has also been suggested that a plurality of spanwise slits over an open vacuum slot be provided. However, these have proved difficult and costly to produce due to manufacturing complexities including, for example, the close tolerances required. Since these slits have usually been cut on the complex contours of, for example, an airfoil, skilled craftsmen and special tools have been necessary. In an effort to avoid this problem, it has been further suggested that prefabricated strips, containing suction slits, be used. This approach again requires special tools to produce a carefully machined ledge in the suction slot to hold the prefabricated strip, since the surface containing the slot is frequently a complex contour. Even where the body contour is relatively simple, close machining tolerances have been necessary due to surface smoothness requirements after the strip is installed.

The industry has long sought an inexpensive method of providing boundary layer suction that does not require complex machining equipment.

Accordingly, it is an object of the present invention to overcome the disadvantages set forth above and to provide a simple and inexpensive method and apparatus for obtaining the desired surface smoothness in a body.

More particularly, it is an object of this invention to provide a simple and inexpensive method of installing a laminar flow control suction insert to a body.

It is a further object of this invention to provide a simple and inexpensive method of attaching insert strips to a body.

It is yet another object of this invention to provide a method of installing a laminar flow control suction slit system in the surface of an airfoil, which method requires neither close machining tolerances nor complex installation procedures.

It is a further object of this invention to provide a method of attaching inserts to airfoils, which method requires neither extremely skilled personnel nor complex and expensive tools.

It is another object of the invention to provide an insert strip, for use in a laminar flow control-type body, that may be easily and inexpensively removed and replaced when necessary.

SUMMARY OF THE INVENTION

Briefly, these and other objects are achieved in accordance with the structural aspects and method steps of the invention in which an insert made up of a surface layer and a section of porous, inelastically compressible or deformable foam is first secured in the slot or depression it is desired to fill, and is then compressed or deformed to the level of the surrounding body surface.

Further details of these and other novel features as well as additional objects and advantages of the invention will become apparent and be best understood from a consideration of the following description taken in connection with the accompanying drawing which is provided by way of illustrative example only.

BRIEF DESCRIPTION OF THE DRAWINGS

FIG. 1 is a cross-sectional view through the two elements of the insert strip.

FIG. 2 is a cross-sectional view showing the insert strip assembled.

FIG. 3 is a fragmentary sectional view of the body external panel and insert prior to compression.

FIG. 4 illustrates the body panel section of FIG. 3 after the insert is compressed.

FIG. 5 is a perspective view, of a simple apparatus for compressing the insert strip in accordance with the method of the invention.

DESCRIPTION OF THE PREFERRED EMBODIMENTS

Figure 6:
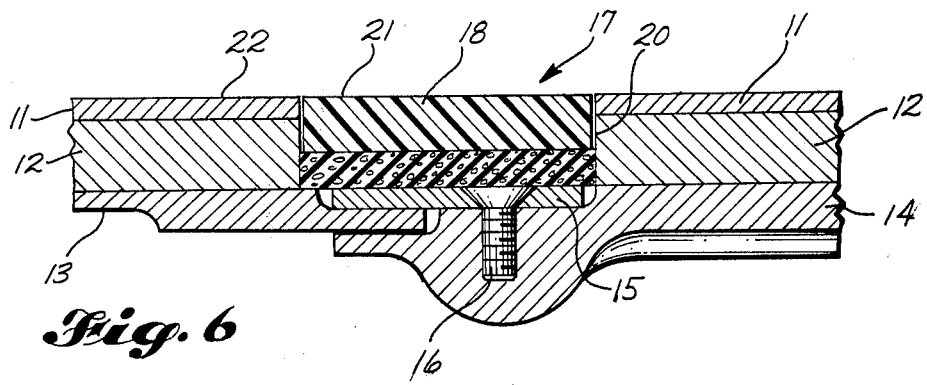
FIG. 6 is a sectional view of one portion of an access hole cover in the body, employing the novel arrangement.

Referring first to FIGS. 1 and 3, an insert, generally designated 10, is shown. Insert 10 is formed by securing a relatively thin, nonporous strip 1 to a section of inelastically and uniformly compressible porous air-permeable material 2. A variety of known materials for the elements of insert 10 will occur to those skilled in the art. One type of porous material that may be used is an aluminum alloy foam, sold under the name Duocel, by Energy Research and Generation, Inc.; Lowell and 57th Streets; Oakland, Calif. 94608. This material can be made from any aluminum alloy and is manufactured by directional solidification of metal from a super-heated liquidus state, in an environment of inert materials and a vacuum. The resulting material has a reticulated structure of open, duodecahedronal-shaped cells connected by continuous, solid-metal ligaments. The solid-metal ligaments routinely test to 99 percent purity of the parent alloy and are not porous. The cell-ligament matrix is completely repeatable, regular and uniform throughout. Duocel is available in densities of from 3 to 20 percent in cell sizes of 10, 20 or 40 pores per inch. Useful properties of the porous material are that it is essentially nonelastically deformable and yet is sufficiently rigid to support surface strip 1. Strip 1 may be, for example, aluminum.

Strip 1 and foam 2 are obtained in, or cut to, approximately the same width w. This width should be approximately the same as the width of body panel slot 3. However, close cutting or machining tolerances for any of the strip, foam or slot are not required, since minor width variations will be compensated, as shown in FIG. 4, by adhesive sealant 4 upon installation. Any variations or irregularities in slot depth are automatically compensated by the novel method, as discussed in greater detail, infra. Strip 1 and foam 2 are bonded or otherwise secured in a manner known per se, to form insert 10 (FIG. 2). If desired, a suction slit 5 of appropriate width $w_s$ may be cut or machined in the insert. Since insert 10 exhibits a simple rectilinear contour at this point, cutting of slit 5 is relatively simple and inexpensive. Of course the process can be used with inserts (or insert portions) having no slits, as will be discussed in greater detail with regard to FIGS. 6 and 7.

FIG. 3 shows insert 10 after insertion into slot 3. As noted previously, insert 10 may be easily and inexpensively held in slot 3 using a known adhesive sealant 4. At this point in the process, insert 10 extends above surface 7 of skin 6 by a distance h. As will be apparent to those skilled in the art, distance h is determined by the depth of slot 3 and the height of insert 10. These parameters may be determined by considering, for example the thickness of strips 1, pre- and post-compression densities of foam 2, slit width $w_s$ and the volume of boundary layer suction desired.

Tubes or holes 8 (only one of which is shown) are provided through body panel 6, beneath insert 10, to create a fluid flow path to a source of negative pressure 8'. After compression (see FIG. 4), surface 8 of strip 1 and surface 7 of panel 6 are substantially coplanar and surface smoothness is well within the required laminar flow control tolerances.

FIG. 5 schematically illustrates one arrangement for compressing or compacting insert 10. A rubber roller 9, of appropriate hardness, is pressed against insert 10 and moved along panel 6. Foam 2 will be uniformly and inelastically compressed producing the necessary surface smoothness.

Figure 7:
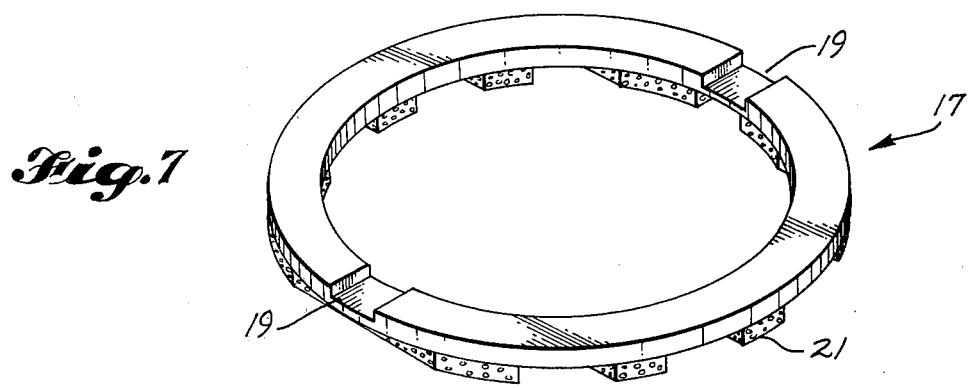
FIG. 7 is a perspective view of a compressible clamp ring cover.
Figure 8:
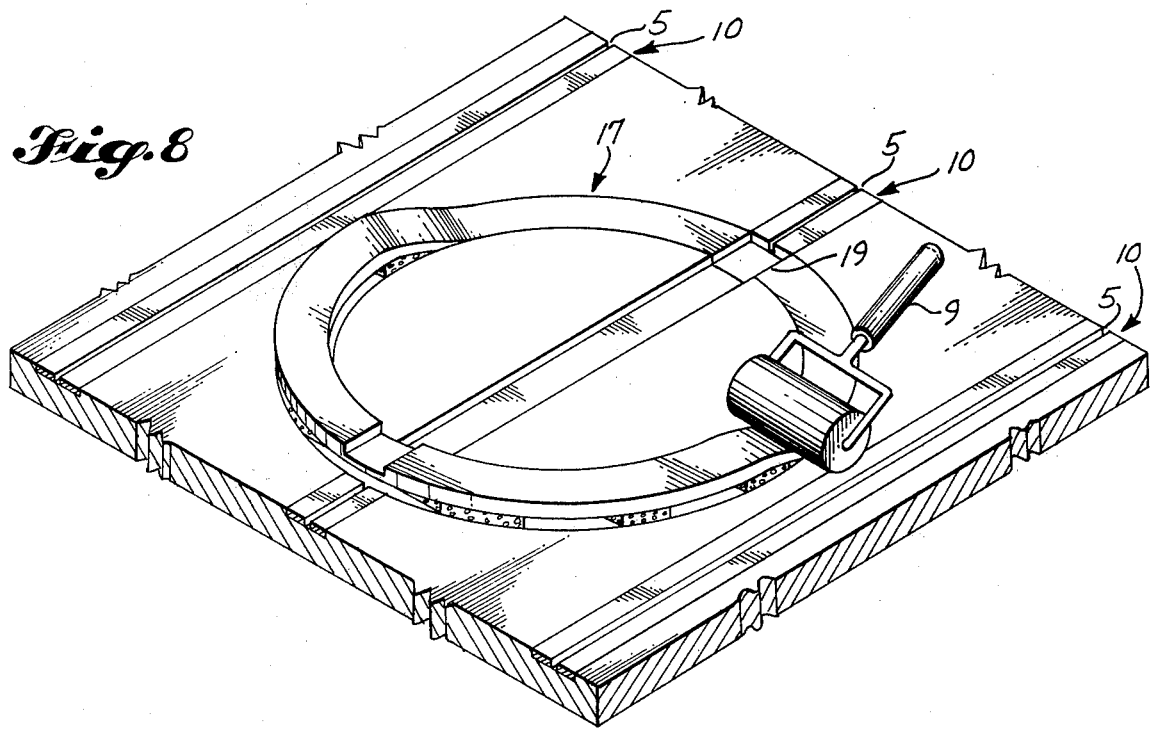
FIG. 8 is a perspective view of an access hole and clamp ring cover insert showing the installation method of the invention.

FIGS. 6-8 illustrate another example of how the inventive process may be used in a laminar flow control system. As discussed previously, a predetermined degree of surface smoothness is critical throughout the area of laminar flow. As shown in FIG. 6, one type of laminar flow body construction utilizes an external panel 11 over a spacer 12 in contact with structural skin 13. To provide access to various internal components, it is necessary to provide holes in structural skin 13. These holes are then covered by removable access doors 14, held in place by clamp ring 15 and fasteners 16 (only one shown). As shown in FIG. 6, doors 14 are also provided with a spacer 12 and external panel 11. In prior constructions, careful machining was required to provide a smooth mating area between door 14, ring 15 and skin 13. These time consuming and expensive operations are avoided in the present arrangement by using the inventive method and construction to provide a compressible clamp ring cover, generally designated 17. As shown in FIGS. 7-8, cover 17 is formed by a strip 18 and one or more compressible foam blocks 21. Strip 18 is provided with diametrically opposed slots 19 of sufficient depth to accomodate a suction insert 10 so as to provide continuous laminar flow control across door 14.

As is apparent from FIGS. 6 and 8, cover 17 is positioned over ring 15 in a slot 20 which slot extends through panel 11 and spacer 12. Cover 17 is oriented so as to align slots 19 with adjacent insert 10 as seen in FIG. 8. After cover 17 is secured in position, e.g., by conventional adhesive sealant, it is compressed in the same manner as insert 10, discussed supra. After compression, surface 21 of strip 18 and surface 22 of panel 11 are substantially coplanar and laminar flow is uninterrupted. An appropriately dimensioned insert 10 may then be secured in slot 19 and compressed. To insure exact alignment of suction slit 5 across cover 17, the slit in this insert 10 may be cut after installation in slot 19.

To remove access door 14, it would obviously be necessary to destroy cover 17, however, as noted above, removal and replacement using the inventive process is a relatively simple and inexpensive operation. Replacement costs would be even further reduced if clamp ring cover dimensions were standardized.

There has thus been described an insert and method of installation therefor which exhibits the advantages and achieves the objects set forth hereinabove.

Obviously, other means such as a flat press could be used to perform the compression step of the novel process. Other variations and modifications will occur to persons skilled in the art without departing from the spirit and scope of the invention. Accordingly, it is intended that the appended claims cover all such variations and modifications.

What is claimed is:

1. A process for installing an insert in an exterior panel of a body comprising the steps of
    first, selecting an insert which includes an inelastically compressible, air-permeable segment;
    securing a relatively thin, non-porous strip to one surface thereof;
    cutting a slit through said strip
    then positioning said insert in a slot in said panel; then compressing said insert; and then
    providing a fluid flow path from said slit through said segment to a source of negative pressure;
    so that said insert substantially fills said slot, an outer surface of said strip is level with an outer surface of said panel and said segment remains air-permeable.

2. A process according to claim 1 further including the step of securing said porous segment in said slot prior to said compressing step.

3. A process according to claim 2 wherein said securing step seals the other surfaces of said segment against said slot.

4. A process according to claim 1 wherein said porous segment is aluminum foam.

5. A process according to claim 1 wherein said porous segment is Duocel foam.

6. A process according to claim 1 wherein said compressing step includes passing a roller over said panel surface, in forced contact with said insert, said force being sufficient to inelastically compress said insert.

7. A method of manufacturing a laminar flow control arrangement for an airfoil comprising the steps of
providing an airfoil having an exterior panel surface;
forming at least one slot in said surface;
providing a uniformly, nonelastically compressible, porous material,
bonding one side of a nonporous strip to one surface of said material;
forming a slit entirely through said strip;
bonding and sealing said material in said slot;
then, compressing said material until the other side of said strip is level with said panel surface; and
providing fluid communication between said material and a source of negative pressure, whereby, boundary layer air on said panel surface may be drawn through said slit and material by said source.

* * * * *